Figure 1A:
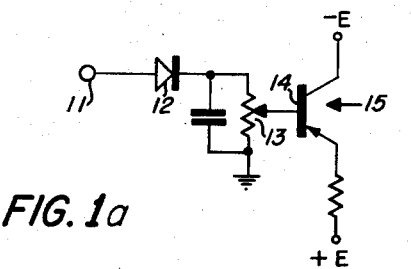

March 30, 1965   G. G. LAMPKE   3,176,148
AUTO-STABILIZED LEVEL SELECTOR
Filed Jan. 20, 1960

INVENTOR
GEORGE G. LAMPKE
BY
ATTORNEY

United States Patent Office 3,176,148
Patented Mar. 30, 1965

3,176,148
AUTO-STABILIZED LEVEL SELECTOR
George G. Lampke, Framingham, Mass., assignor to Raytheon Company, Lexington, Mass., a corporation of Delaware
Filed Jan. 20, 1960, Ser. No. 3,520
14 Claims. (Cl. 307—88.5)

This invention relates generally to diode detectors or other analogous detectors for producing a signal having a D.C. level which represents a predetermined function of an A.C. input signal and more particularly to an improved auto-stabilized level selector for generating a D.C. voltage equal in amplitude to a fixed fraction of the peaks of an A.C. input signal.

In the design of electronic equipment, many situations arise where it becomes necessary to compare an A.C. signal with a D.C. voltage having a level which represents a definite percentage of the peak to peak amplitude of the alternating signal. For maximum accuracy, the D.C. level should remain independent of the amplitude or regularity of the alternating signal of which it is a function.

In the past diode detectors and analogous detector systems have been utilized to produce D.C. signals having a level which is a predetermined function of an alternating input signal. Although these previous systems have provided the D.C. levels required, they have often been subject to large percentages of drift from the original level value when they are subjected to wide temperature variations. These drifts have also been caused by the combination of input voltage variations and the variances inherent within the individual circuit components.

It is a primary object of this invention to provide an auto-stabilized level selector for obtaining, from an A.C. input signal, a D.C. output signal having a level which accurately represents a definite percentage of the peak to peak amplitude of the input signal.

Another object of this invention is to provide an auto-stabilized level selector utilizing the principle of non-linear feedback to derive a D.C. output voltage equal to a fixed fraction of the peak to peak amplitude of an A.C. input signal.

A further object of this invention is to provide an auto-stabilized level selector which will produce, from an A.C. input signal, a D.C. output signal having a level which accurately represents a definite percentage of the peak to peak amplitude of the input signal independent of the amplitude or regularity of the input signal.

A still further object of this invention is to provide an auto-stabilized level selector for producing from an A.C. input signal a D.C. output signal having a level which is maintained, within accuracies of about one percent, equal to a fixed fraction of the peak to peak amplitude of the input signal, regardless of wide temperature changes or varying values of circuit components.

Figure 1B:
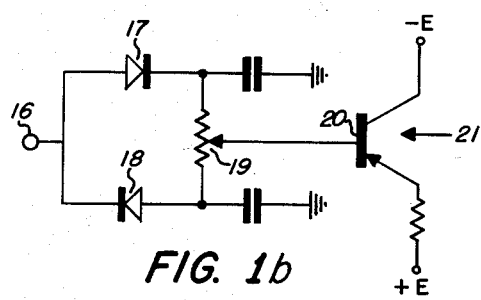
Figure 2:
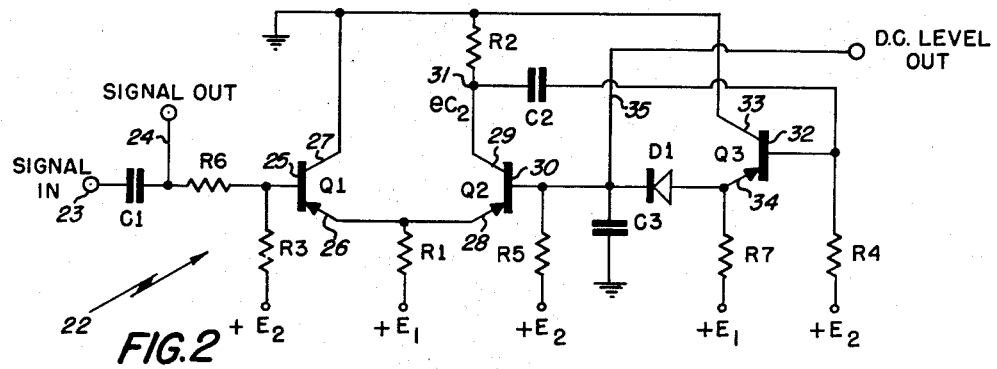
Figure 3:
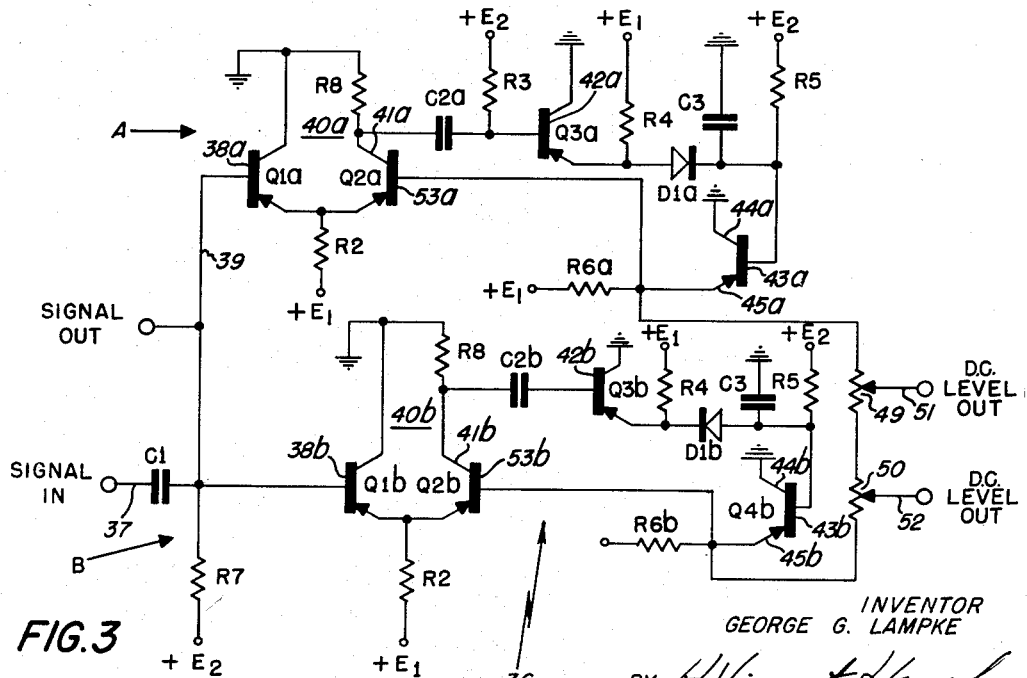

The foregoing and other objects of this invention will be readily understood from the following description taken in connection with the accompanying drawings in which:

FIGURES 1a and 1b illustrate circuit diagrams of basic diode detectors well known to the prior art;
FIGURE 2 is a circuit diagram of the auto-stabilized level selector of the present invention; and
FIGURE 3 is a circuit diagram of an embodiment of the auto-stabilized level selector of the present invention.

FIGURE 1a illustrates a well-known diode detector circuit in which an alternating input signal is fed by means of an input 11 to a diode element 12. The diode 12 produces a D.C. output signal, the level of which may be regulated to a predetermined function or percentage of the alternating input signal by means of a variable resistance 13. The regulated signal from resistance 13 is then fed as a biasing voltage to the base 14 of a transistor element 15. The output from the transistor 15 is then fed to any suitable utilization circuit, not illustrated. The detector circuit of FIGURE 1a may be used to derive a D.C. voltage equal to a fixed fraction of the peak to peak amplitude of an alternating input signal only when the longtime average of the input signal remains at the mode of the signal. The mode is defined as the half-way point between the two extremes of the signal and is independent of the average signal point.

When the average of the signal is indeterminant and does not remain at the mode, both the positive and negative peaks of the input signal must be detected, and the circuit illustrated by FIGURE 1b is utilized. In this circuit a varying input signal having both positive and negative peaks is fed by means of input 16 to two diode elements 17 and 18 which are reversely poled so that both the negative and positive peaks of the input signal may be detected. Diodes 17 and 18 provide a D.C. output signal which is fed to a variable resistance 19. Variable resistance 19 regulates the level of the D.C. signal to a value which is a predetermined percentage of the amplitude of the alternating input signal. The regulated signal from resistor 19 is then fed as a bias voltage to the base 20 of a transistor element 21. The output of transistor 21 is coupled to any desired utilization circuit, not shown.

Although the detector systems illustrated in FIGURES 1a and 1b will derive from an alternating input signal a D.C. output signal having a level which is equal to a predetermined percentage of the amplitude of the input signal, the D.C. signal level produced by these circuits may drift as much as ten to twenty percent of the original value over wide temperature ranges. These drifts may also be caused by the combination of voltage variations across the resistors 13 and 19 due to diode variances.

In order to increase the stability of the basic diode detector in FIGURE 1a the auto-stabilized level selector of the present invention as shown by FIGURE 2 may be employed. The auto-stabilized level selector indicated generally at 22 comprises an input 23 which is coupled to a source of A.C. input signals. This A.C. input signal is passed to the selector system by means of a coupling capacitor C1 which decouples any D.C. component present in the A.C. input signal. The signal from capacitor C1 is then attenuated by means of a resistor R6 so that it is reduced in amplitude by the percentage required to produce a D.C. output signal of a desired level from the system. It is also fed by means of a lead 24 to a signal output contact where the full value of the input signal may be sampled. A fixed positive D.C. voltage indicated as $+E2$ is supplied across a resistor R3 to mix with the attenuated input signal from resistor R6 at the base 25 of a transistor element Q1. No current flows through resistors R6 and R3, as only voltage potentials are applied thereto. Since capacitor C1 decouples any D.C. component present within the input signal and as no current flows through the resistor R3, the average level of the attenuated signal at the base of transistor element Q1 is equal to $+E2$, as the average level of a composite D.C. and symmetrical A.C. signal is equal to the amplitude of the D.C. component.

Transistor element Q1 with a second transistor element Q2 composes a high gain current switch which provides the gain necessary to insure stability throughout the complete stabilized level selector system. The emitters 26 and 28 of transistors Q1 and Q2 are commonly connected and receive power from a common source E1 via a dropping resistor R1. The collectors 27 and 29 of transistors Q1 and Q2 are commonly connected to ground, but a collector load impedance R2 is included in the collector circuit of transistor Q2. The base of transistor Q2 receives the fixed D.C. reference voltage +E2 and also a control signal from a detector system which will be described later. The current available at the common emitters 26 and 28, which is designated I, will flow through Q2 when the signal at the base of Q1 causes it to become more positive than the base of Q2. When the signal at the base of Q1 causes it to become more negative than the base of Q2, the current I flows through Q1 thereby cutting off Q2. When transistor Q2 is triggered into conduction by a positive signal on the base of Q1, current I flows through Q2 and produces a signal designated as $ec_2$ at the collector of Q2 by virtue of the presence of collector load impedance R2. In order to recover the D.C. level required, the average of signal $ec_2$ at the collector of transistor Q2 must be shifted to the value of +E2, or the same value as the average of the attenuated input signal. This is accomplished by taking the collector signal $ec_2$ from a point 31 at the input of the collector load impedance R2 and feeding it to a capacitor C2. As long as signal $ec_2$ is present in the collector circuit of transistor Q2, a varying voltage potential will be present across capacitor C2. This voltage potential is fed to the base 32 of a transistor buffer amplifier Q3 where it is mixed with the fixed D.C. potential +E2 which is applied across a resistor R4.

Transistor Q3 includes a grounded collector 33 and an emitter 34 from which the output signal of the transistor is taken. Emitter 34 receives power from a positive source +E1 over a dropping resistor R7. Transistor Q3 acts to buffer the signal received by its base 32, and the output signal from the emitter 34 is peak detected by a diode detector D1 and its associated circuitry which includes a capacitance C3 and a resistance R5. Diode D1 may be poled to detect either the negative or positive peaks of the signal from transistor Q3. The detected D.C. signal from the output of diode D1 is fed to the base 30 of transistor Q2, and it is also passed, by means of an output lead 35, to the D.C. level output of the level selector circuit. It will thus be apparent that the circuit including capacitor C2, transistor Q3 and diode detector D1 forms a nonlinear feedback loop which provides a control signal to the base of transistor Q2.

In the operation of the circuit shown by FIGURE 2, an alternating input signal is fed to input 23, is attenuated by resistor R6, and is mixed with the D.C. voltage across R3. This attenuated signal is then passed to the base 25 of transistor Q1, which in conjunction with transistor Q2 forms a high gain current switch. When this signal on the base of Q1 causes it to become more positive than the base of Q2, a current I, available at the common emitters 26 and 28, will flow through Q2 producing a signal $ec_2$ at the collector 29 of transistor Q2. The gain of the transistor switching circuit Q1 and Q2 is a function of the current available at the emitters, the value of collector load impedance R2, and the forward voltage drop designated as $Veb$ from the emitter to the base of the particular conducting transistor. If I equals the current available at the common emitters 26 and 28, while E1 minus E2 equals a constant voltage across R1, and R1 equals the resistance of resistor R1, then $$I = (E1-E2)/R1$$

As the resistance of R1 is fixed and the voltage thereacross is also fixed, the current is equally fixed.

Assuming now the $Veb$ or the voltage drop from the emitter to the base of the conducting transistor equals .1 volt, a signal on the base of the non-conducting transistor whose peak to peak amplitude is .2 volt will cause the current to switch completely from one transistor to the other producing a signal at the collector of the conducting transistor which is equal to $ec_2$. Thus when the signal at the base of transistor Q1 causes transistor Q2 to conduct, the signal $ec_2$ at the collector of transistor Q2 will be: $ec_2 = (E1-E2)R2/R1$, where R2 is the resistance value of the collector impedance R2. The voltage drop across the conducting transistor need not be considered in the formula, as the base-emitter impedance during conduction is negligible. Once the initial switching from transistor Q1 to transistor Q2 takes place, this signal $ec_2$ at the collector of transistor Q2 will remain constant, although the signal on the base of Q1 increases above .2 volt, and thus the gain of the circuit will decrease proportionately. If then the voltage level at the base of Q2 is initially at the mode of the signal at the base of Q1, and the voltage at the base of Q1 begins to rise until it exceeds this level by more than .1 volt, the positive signal $ec_2$ will result across the collector of Q2. This signal $ec_2$ causes a voltage to build up across capacitor C2, and this voltage is applied at the base of transistor Q3. Transistor Q3 produces a buffered output signal which is peak detected by D1, C3 and R5 and is then fed back to the base of Q2 as a D.C. signal for comparison with the attenuated signal at the base of Q1. This D.C. signal causes the base of Q2 to increase in a positive direction. As long as the signal at the base of Q1 exceeds the level at the base of Q2 by .1 volt, signal $ec_2$ will continue to be developed at the collector of Q2, and the D.C. signal at the base of transistor Q2 will continue to increase in a positive direction. As the base of Q2 becomes more positive the signal at the collector of Q2 will decrease until finally a point of equilibrium is reached. At this time the D.C. level at the base of Q2 is at the peak of the attenuated signal at the base of Q1, and it will remain at this level regardless of the amplitude variations of the input signal. The circuit will function in the same manner if the diode D1 is reversely poled and the negative peaks of the input voltage are used.

Since the collector signal $ec_2$ is eventually shifted to the same voltage as the input signal, the circuit will also recover if the D.C. level at the base of Q2 is initially more positive than the signal at the base of Q1. If this condition exists, Q2 is cut off and the voltage at the base of Q3 will discharge toward +E2 which is in the active range of the circuit.

Once the correct D.C. output level has been established, variations in this level might result if the circuit of diode detector D1 is loaded too heavily or if there are changes of emitter to base voltages in transistors Q1 and Q2 due to temperature variation. The former problem, if it becomes objectionable, can be eliminated by inserting an emitter follower in series with the peak detector circuit, while variations of the voltage +E2 under varying temperature conditions will not affect the stability of the circuit.

FIGURE 3 discloses an auto-stabilized level selector circuit for detector systems which will produce one or more D.C. output signals having a level which is a fixed percentage of an A.C. input signal whose average is not necessarily at the mode. This circuit, indicated generally at 36, is formed by combining two circuits of the type disclosed by FIGURE 2. One of these circuits or channels, indicated at A, is of the type shown by FIGURE 2 and detects the positive peaks of an input signal, while the second circuit or channel, indicated at B, detects the negative peaks of the input signal. This negative detection may be accomplished by reversing the polarity of diode D1 of FIGURE 2. Level selector circuit 36 receives a positive and negative going input signal from an input lead 37, which is connected to an appropriate signal source. This input signal is fed by a coupling capacitor C1 to the base 38b of a transistor Q1b, and by means of a base connecting lead 39 to the base 38a of a transistor Q1a. Transistors Q1a and Q1b cooperate with two transistors Q2a and Q2b to form two high gain current switches 40a and 40b of the type formed by transistors Q1 and Q2 of FIGURE 2. These high gain current switches 40a and 40b act in the same manner as the switch shown in FIGURE 2 to derive a collector signal at the collectors 41a and 41b of transistors Q2a and Q2b. This collector signal causes a voltage to build up across two capacitors C2a and C2b, and this voltage is then passed to the bases 42a and 42b of two buffer amplifiers Q3a and Q3b. The buffered outputs of Q3a and Q3b are fed to oppositely poled diode detectors D1a and D1b. Detector D1a is poled so that the positive peaks of its input signal are sensed, while detector D1b is poled so that it senses the negative peaks of its input signal. The positive D.C. output of detector D1a is then fed to the base 43a of an emitter follower Q4a, while the negative D.C. output of detector D1b is fed to the base 43b of an emitter follower Q4b. The emitter followers Q4a and Q4b include grounded collectors 44a and 44b and emitters 45a and 45b which receive power from a suitable voltage source via dropping resistors R6a and R6b. The D.C. output signals are taken from emitters 45a and 45b which are commonly connected across an output circuit which includes a voltage divider circuit 48 formed by variable potentiometers 49 and 50. Since the average of the signal at input 37 is not at the mode and is therefore indeterminate, a simple attenuator as shown in FIGURE 2 cannot be used to derive the required percentage of the input signal. It is therefore necessary to detect both the positive and negative peaks of the original signal and to then obtain the required D.C. levels by tapping off the voltage divider 48 which has been placed across the two peak detectors D1a and D1b. Thus variable potentiometers 49 and 50 furnish a D.C. signal of the desired level to outputs 51 and 52. The output voltage at the emitters 45a and 45b of the emitter followers Q4a and Q4b is also passed to the bases 53a and 53b of transistors Q2a and Q2b where it is compared with the signal on the bases of transistors Q1a and Q1b in the manner described in connection with FIGURE 2.

In the operation of the auto-stabilized level selector of FIGURE 3, the two separate channels A and B of the circuit 36 operate, with the exception of minor variations, in the same manner as does the circuit of FIGURE 2. Because the average of the input signal to the circuit is not at the mode, it is necessary to feed the complete signal to the two high gain current switches 40a and 40b. It is also necessary to detect both the positive and negative peaks of this input signal and then to obtain a D.C. output signal of the required level by tapping off a voltage divider placed between the two peak detectors. To eliminate unnecessary loading, the emitter followers Q4a and Q4b are placed in series with the peak detectors and the voltage divider is then placed across the emitter followers as shown.

It will be readily apparent to those skilled in the art that the present invention provides an auto-stabilized level selector for detector systems which is capable of producing a D.C. output signal having a level which accurately represents a definite percentage of the peak to peak amplitude of a varying input signal regardless of the amplitude or regularity of the input signal. The arrangement and types of components utilized within this invention may be subject to numerous modifications well within the purview of this inventor who intends only to be limited to a liberal interpretation of the specification and the appended claims.

I claim:

1. An auto-stabilized level selector for detector systems comprising input means connected to a source of alternaing input voltage, signal controlled switching means having an output and first and second inputs, the first input receiving the alternating input voltage from said input means, feedback means connected from the output to the second input of said switching means, and output means coupled to said feedback means, said feedback means including a peak detector system which produces a direct current voltage equal to a predetermined percentage of the peak to peak amplitude of said alternating input voltage, said direct current voltage being fed to said output means and also as a control signal to the second input of said current controlled switching means.

2. An auto-stabilized level selector for detector systems comprising input means connected to a source of alternating voltage, signal controlled high gain current switching means having an output and a plurality of inputs, one of said inputs receiving the alternating input voltage from said input means, nonlinear feedback means connected from the output to one of the plural inputs of said high gain switching means, and output means coupled to said nonlinear feedback means, said feedback means including a capacitor connected to the output of said high gain current switch, a buffer amplifier coupled to said capacitor, a peak detector connected to said buffer amplifier, and an emitter follower connected in series with the peak detector, said peak detector feeding a direct current voltage equal to a predetermined percentage of the peak to peak amplitude of said alternating input voltage to said output means and also as a control signal to one of the plural inputs of said high gain current switching means.

3. An auto-stabilized level selector for detector systems comprising input means connected to a source of alternating input voltage, signal controlled transistor comparator switching means having an output and a plurality of inputs, one of said inputs receiving the alternating input voltage from said input means, feedback means connected from the output to one of the plural inputs of said transistor comparator switching means, and output means coupled to said feedback means, said feedback means including a peak detector system for producing a direct current voltage which is a predetermined function of said alternating input voltage, said direct current voltage being fed to said output means and also to one of the plural inputs of said transistor comparator switching means where it is compared to the alternating input voltage received at another input to said transistor comparator switching means.

4. An auto-stabilized level selector for detector systems comprising input means connected to a source of alternating input voltage, transistor switching means including first and second commonly connected transistor elements having base, emitter, and collector electrodes, the base electrode of said first transistor element receiving the alternating input signal from said input means, a feedback means connected between the collector and base electrodes of said second transistor element, and output means coupled to said feedback means, said feedback means including a detector system which provides a direct current voltage having a level which is equal to a fixed fraction of the peak to peak amplitude of said alternating input voltage.

5. An auto-stabilized level selector for detector systems comprising input means connected to a source of alternating input voltage, transistor switching means including first and second transistor elements having emitter, base, and collector electrodes, said emitter electrodes being commonly connected to an external voltage source and said collector electrodes being commonly connected to ground, the base of said first transistor element receiving the alternating input voltage from said input means, feedback means connected between the collector and base of said second transistor element, and output means coupled to said feedback means, said feedback means including a detector system which provides a direct current voltage having a level which is a function of said alternating input voltage, said direct current voltage being fed to said output means and also to the base of said second transistor element.

6. An auto-stabilized level selector for detector systems comprising input means connected to a source of alternating input voltage, signal controlled transistor switching means including first and second commonly connected transistor elements having emitted, collector, and base electrodes, the base electrode of said first transistor element receiving the alternating input voltage from said input means, means for developing a signal at the collector of said second transistor element when the base of said first transistor element becomes more positive than the base of the second transistor element, feedback means connected between the collector and base of said second transistor element, and output means coupled to said feedback means, said feedback means including a detector system for producing a direct current voltage which is fed to said output means and also to the base of said second transistor element.

7. An auto-stabilized level selector for detector systems comprising input means connected to a source of alternating input voltage, signal controlled transistor switching means including first and second commonly connected transistor elements having emitter, collector and base electrodes, the base of said first transistor element receiving the alternating input voltage from said input means, means for developing a signal at the collector of said second transistor element when the base of the first transistor element is at a higher potential than is the base of said second transistor element, feedback means connected to the collector of said second transistor element, and output means coupled to said feedback means, said feedback means including a capacitor connected to the collector of said second transistor element, a buffer amplifier connected to said capacitor, and a peak detector connected to said buffer amplifier, said peak detector producing a direct current voltage which is fed to said output means and also to the base of said second transistor element for comparison with the alternating voltage on the base of said first transistor element.

8. An auto-stabilized level selector for detector systems comprising input means connected to a source of alternating input voltage, signal controlled transistor switching means including first and second transistor elements having emitter, base and collector electrodes, said emitter electrodes being commonly connected to an external voltage source and said collector electrodes being commonly connected to ground, the base of said first transistor element receiving the alternating input voltage from said input means, means for developing a signal at the collector of said second transistor element when the base of the first transistor element is at a higher potential than is the base of said second transistor element, nonlinear feedback means connected between the collector and base of said second transistor element, and output means coupled to said feedback means, said nonlinear feedback means including a capacitor connected to the collector of said second transistor element, a transistor buffer amplifier connected to said capacitor, a diode peak detector system connected to said buffer amplifier, and a transistor emitter follower connected in series with said diode peak detector system, said diode peak detector system producing a direct current signal which is fed to said output means and also to the base of said second transistor element, said direct current signal increasing in amplitude until the potential at the base of said second transistor element becomes equal to that at the base of said first transistor element.

9. An auto-stabilized level selector for detector systems comprising input means connected to a source of alternating input voltage, said input voltage source producing a positive and negative going input signal having a long time average which remains at the mode of the signal, signal attenuating means connected to said input means, a signal controlled high gain current switching circuit having an output and a plurality of inputs, one of said plural inputs being connected to said signal attenuating means, a nonlinear feedback loop connected between the output and one of the plural inputs of said high gain current switching circuit, and output means coupled to said feedback loop, said feedback loop including a detector system for producing a direct current voltage which is passed to said output means and also to one of the plural inputs of said high gain current switching circuit.

10. An auto-stabilized level selector for detector systems comprising input means connected to a source of alternating input voltage, said input voltage source producing a positive and negative going input signal having a long time average which remains at the mode of the signal, signal attenuating means connected to said input means to limit the input signals to a predetermined level, signal controlled transistor switching means including first and second commonly connected transistor elements having emitter, collector, and base electrodes, the base of said first transistor element receiving the attenuated input signal from said input means, means for developing a signal at the collector of said second transistor element when the base of the first transistor element becomes more positive than the base of said second transistor element, nonlinear feedback means connected between the collector and base of said second transistor element, and output means coupled to said feedback means, said nonlinear feedback means including a diode detector system to detect the positive peaks of the signal at the collector of said second transistor element, said diode detector providing a direct current signal which is fed to said output means and also to the base of said second transistor element, said direct current signal becoming more positive until the potential at the base of the second transistor element reaches a level which is equal to the positive peaks of the attenuated signal at the base of the first transistor element.

11. An auto-stabilized level selector for detector systems comprising input means connected to a source of alternating input voltage, said input voltage source providing a positive and negative going input signal having an average which constantly varies in value from the mode of the signal, first and second signal receiving channels connected to said input means, and circuit output means connected to said signal receiving channels, each of said signal receiving channels including a signal controlled high gain current switch having an output and a plurality of inputs, one of said plural inputs receiving the input signal from said input means, and a nonlinear feedback loop including a detector system connected between the output and one of the plural inputs of said high gain switching circuit, the circuit output means being coupled to said nonlinear feedback loop to receive a direct current signal from the detector systems of said first and second signal receiving channels.

12. An auto-stabilized level selector for detector systems comprising input means connected to a source of alternating input voltage, said input voltage source providing a positive and negative going input signal having an average which constantly varies in value from the mode of the signal, first and second signal receiving channels connected to said input means, and circuit output means connected to said signal receiving channels, each of said signal receiving channels including a signal controlled high gain current switch having an output and a plurality of inputs one of said plural inputs receiving the input signal from said input means, and a nonlinear feedback loop including a detector system connected between the output and one of the plural inputs of said high gain switching circuit, the circuit output means being coupled to the nonlinear feedback loop of said first and second signal receiving channels, said output means including a voltage divider network to control the signal received from said feedback loop.

13. An auto-stabilized level selector for detector systems comprising input means connected to a source of alternating input voltage, said input voltage source providing a positive and negative going input signal having an average which constantly varies in value from the mode of the signal, first and second signal receiving channels connected to said input means, and circuit output means connected to said signal receiving channels, each of said signal receiving channels including a signal controlled high gain current switch having an output and a plurality of inputs, one of said plural inputs receiving the input signal from said input means, and a nonlinear feedback loop including a detector system connected between the output and one of the plural inputs of said high gain switching circuit, the detector system in said first signal receiving channel being poled to detect the positive peaks of a varying input signal and the detector system of said second signal receiving channel being poled to detect the negative peaks of a varying input signal, the circuit output means being coupled to the feedback loops in each of said signal receiving channels and including a voltage divider network to control the signals received from said feedback loops.

14. An auto-stabilized level selector for detector systems comprising input means connected to a source of alternating input voltage, said input voltage source providing a positive and negative going input signal having an average which constantly varies in value from the mode of the signal, first and second signal receiving channels connected to said input means, and circuit output means connected to said signal receiving channels, each of said signal receiving channels having a signal controlled transistor switching means including first and second commonly connected transistor elements having emitter, collector, and base electrodes, the base of said first transistor element receiving the input signal from said input means, means for developing a signal at the collector of said second transistor element when a difference of potential exists between its base and the base of said first transistor element, nonlinear feedback means connected between the collector and base of said second transistor element, said nonlinear feedback means including a capacitor, a buffer amplifier, a diode detector, and an emitter follower, the diode detector of said first signal receiving channel being poled to detect the positive peaks of an input signal while the diode detector of said second signal receiving channel is poled to detect the negative peaks of an input signal, said diode detectors of each signal receiving channel producing a direct current output signal which is fed to the emitter followers and then to the bases of the second transistor elements of said signal controlled transistor switches, said direct current output signals also being fed to the circuit output means which is coupled to the emitter followers of said first and second signal receiving channels, said circuit output means including a voltage divider network formed from a plurality of variable resistance means, said voltage divider network limiting the D.C. output signal to a desired level.

References Cited by the Examiner
UNITED STATES PATENTS

| | | | |
|---|---|---|---|
| 2,683,806 | 7/54 | Moody | 307—88.5 |
| 2,767,314 | 10/56 | Yu | 328—150 |
| 2,842,683 | 7/59 | Clapper | 307—88.5 |
| 2,912,654 | 11/59 | Hansen | 307—88.5 |
| 2,946,013 | 7/60 | Deighton | 328—151 |
| 2,977,411 | 3/61 | Goodrich | 307—88.5 |
| 3,028,558 | 4/62 | Foglia | 328—151 |
| 3,051,852 | 8/62 | Mintz et al. | 307—88.5 |

JOHN W. HUCKERT, *Primary Examiner.*
HERMAN KARL SAALBACH, *Examiner.*